United States Patent
Imai

(10) Patent No.: US 10,627,261 B2
(45) Date of Patent: *Apr. 21, 2020

(54) MOVEMENT DETECTION UNIT

(71) Applicant: TDK CORPORATION, Tokyo (JP)

(72) Inventor: Takakazu Imai, Tokyo (JP)

(73) Assignee: TDK CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/510,019

(22) Filed: Jul. 12, 2019

(65) Prior Publication Data

US 2019/0360842 A1 Nov. 28, 2019

Related U.S. Application Data

(63) Continuation of application No. 15/387,184, filed on Dec. 21, 2016, now Pat. No. 10,378,929.

(30) Foreign Application Priority Data

Dec. 28, 2015 (JP) ................ 2015-255642

(51) Int. Cl.
  *G01V 3/08* (2006.01)
  *G01D 5/249* (2006.01)
  *G01D 5/14* (2006.01)
  *G01D 5/245* (2006.01)

(52) U.S. Cl.
  CPC ............ *G01D 5/249* (2013.01); *G01D 5/147* (2013.01); *G01D 5/2451* (2013.01); *G01V 3/08* (2013.01); *G01V 3/087* (2013.01)

(58) Field of Classification Search
  CPC ...... G01D 5/145; G01D 5/2451; G01D 5/249; G01D 3/08

USPC .................................................. 324/207.13
See application file for complete search history.

(56) References Cited

U.S. PATENT DOCUMENTS

| | | | |
|---|---|---|---|
| 6,674,280 | B1 | 1/2004 | Goetz et al. |
| 7,221,148 | B2 | 5/2007 | Takeuchi et al. |
| 7,231,325 | B2 | 6/2007 | Motz et al. |
| 7,830,278 | B2 | 11/2010 | Lohberg et al. |
| 8,909,489 | B2 | 12/2014 | Saruki et al. |
| 10,018,654 | B2 | 7/2018 | Bertin |

(Continued)

FOREIGN PATENT DOCUMENTS

| | | |
|---|---|---|
| CN | 102384758 A | 3/2012 |
| CN | 204575093 U | 8/2015 |

(Continued)

*Primary Examiner* — Reena Aurora
(74) *Attorney, Agent, or Firm* — Oliff PLC

(57) ABSTRACT

A movement detection unit includes a movable body, a first sensor, a second sensor, and a signal processor. The movable body performs a movement in a first direction. The first sensor detects a first magnetic field change which is caused by the movement of the movable body and outputs a first signal. The second sensor is provided in the first direction at a location different from a location of the first sensor. The second sensor detects a second magnetic field change which is caused by the movement of the movable body and outputting a second signal. The signal processor includes a signal generating circuit that generates a third signal and a fourth signal on a basis of the first signal. The third signal and the fourth signal have waveforms different from each other.

15 Claims, 12 Drawing Sheets

(56) References Cited

U.S. PATENT DOCUMENTS

| | | |
|---|---|---|
| 2001/0002791 A1 | 6/2001 | Tsuge et al. |
| 2005/0258820 A1 | 11/2005 | Forster |
| 2010/0225308 A1 | 9/2010 | Kurumado et al. |
| 2014/0139208 A1 | 5/2014 | Tsuge |
| 2015/0160255 A1 | 6/2015 | Fujihara |
| 2016/0025820 A1* | 1/2016 | Scheller .................. G01P 3/44 |
| | | 324/207.25 |
| 2016/0123774 A1 | 5/2016 | Foletto et al. |
| 2019/0107587 A1* | 4/2019 | Stewart .................. G01R 33/07 |

FOREIGN PATENT DOCUMENTS

| | | |
|---|---|---|
| EP | 0 420 287 B1 | 12/1996 |
| JP | H01-248063 A | 10/1989 |
| JP | H03-115921 A | 5/1991 |
| JP | H06-34645 A | 2/1994 |
| JP | 2014-102150 A | 6/2014 |
| JP | 2015-111062 A | 6/2015 |

\* cited by examiner

MOVEMENT DETECTION UNIT

CROSS REFERENCE TO RELATED APPLICATIONS

This application is a continuation of U.S. application Ser. No. 15/387,184, filed Dec. 21, 2016, the entire contents of which are incorporated herein by reference. This application claims the benefit of Japanese Priority Patent Application JP2015-255642 filed Dec. 28, 2015, the entire contents of which are incorporated herein by reference.

BACKGROUND

The technology relates to a movement detection unit with a magnetic detection device that detects a change in a magnetic field.

Rotation detection units are generally used to detect rotational movements of axles and other rotating bodies. An exemplary rotation detection unit includes a gear wheel having a magnetic body, and a magnetic detection device disposed in non-contact with the gear wheel (e.g., refer to Japanese Unexamined Patent Application Publications Nos. H6-34645 and 2015-111062).

SUMMARY

In recent years, there has been a demand for rotation detection units to detect a speed of a rotation of a gear wheel even at a low speed with high precision. When a gear wheel rotates at a low speed, its angle of rotation per unit time becomes small. Therefore, the larger number of teeth in a gear wheel may be preferable in order to detect a small amount of rotation of the gear wheel.

However, the maximum number of teeth provided in a gear wheel may be limited by various factors, including dimensions of the gear wheel itself and machining accuracy of the gear teeth. Moreover, even if many small gear teeth are machined accurately in a gear wheel, there are cases where magnetic field changes around the gear teeth are made small due to a decrease in dimension of the gear teeth, and magnetic fields produced by adjacent gear teeth interfere with each other. In this case, detection sensitivity of the magnetic detection device may be decreased.

It is desirable to provide a movement detection unit that detects a low-speed movement with high precision.

A movement detection unit according to an embodiment of the technology includes a movable body, a first sensor, a second sensor, and a signal processor. The movable body performs a movement in a first direction. The first sensor detects a first magnetic field change which is caused by the movement of the movable body and outputs a first signal. The second sensor is provided in the first direction at a location different from a location of the first sensor. The second sensor detects a second magnetic field change which is caused by the movement of the movable body and outputting a second signal. The signal processor includes a signal generating circuit that generates a third signal and a fourth signal on a basis of the first signal. The third signal and the fourth signal have waveforms different from each other.

In the movement detection unit according to the embodiment of the technology, the signal generating circuit generates, on the basis of the first signal, the third signal and the fourth signal having waveforms different from each other. Therefore, pulses at different timings are obtained on the basis of both the comparisons between the second signal and the third signal and between the second signal and the fourth signal.

DETAILED DESCRIPTION

Some embodiments of the disclosure will be described in detail below with reference to the accompanying drawings. The description will be given in the following order.
1. First embodiment
   A rotation detection unit with a signal generating circuit including adders
2. Modification of first embodiment
   A rotation detection unit having an output signal with a duty ratio of 0.5
3. Second embodiment
   A rotation detection unit with a signal generating circuit including amplifiers
4. Other modifications

1. First Embodiment

[Configuration of Rotation Detection Unit]

Figure 1:
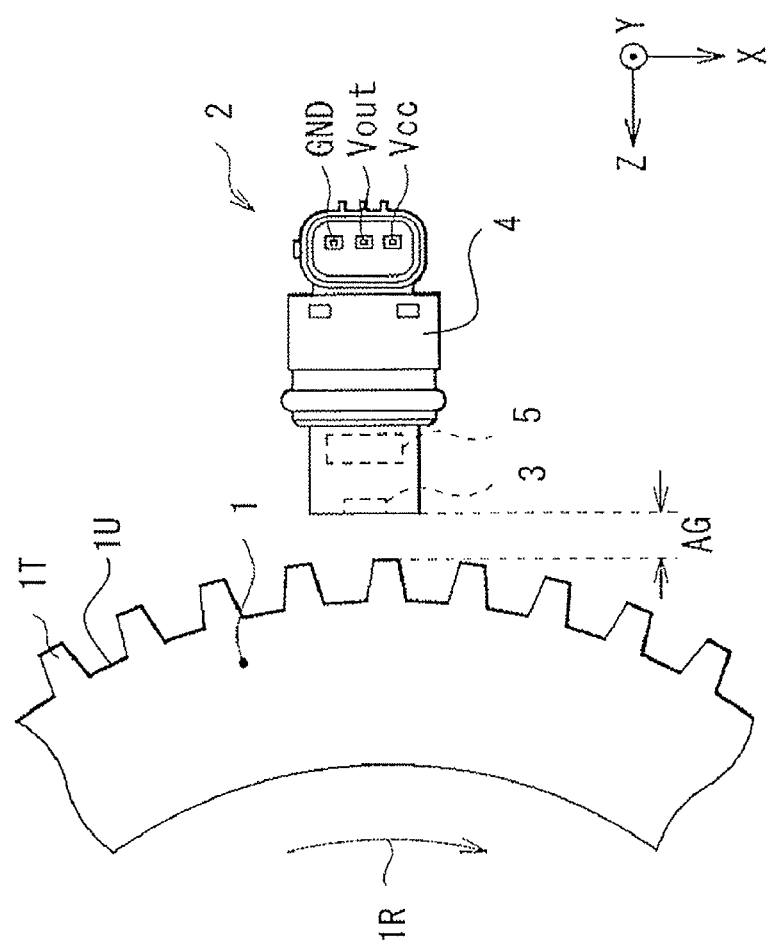
FIG. 1 is a schematic view of an overall configuration of a rotation detection unit according to a first embodiment of the disclosure.

A description will be given below of a configuration of a rotation detection unit according to a first embodiment of the technology, with reference to FIG. 1, FIG. 2, and some other drawings. FIG. 1 is a schematic view of an overall exemplary configuration of the rotation detection unit. The rotation detection unit may be a so-called gear tooth sensor or a so-called gear sensor. The rotation detection unit may include a gear wheel 1 and a main body 2, for example. It is to be noted that the rotation detection unit may correspond to a "movement detection unit" in one specific but non-limiting embodiment of the technology.

(Gear Wheel 1)

The gear wheel 1 may be a rotating body that rotates in a direction denoted by an arrow 1R. The gear wheel 1 may have a disc-shaped member provided with a gear teeth part on its circumference. This gear teeth part may include a plurality of projections 1T and a plurality of depressions 1U. These projections 1T and depressions 1U may each be made of a magnetic body and may be alternately disposed at predetermined intervals (e.g., about 2 mm to 7 mm). The rotational movement of the gear wheel 1 may cause the projections 1T and the depressions 1U to be alternately positioned at a position nearest to a sensor unit 3 in the main body 2. Details of the sensor unit 3 will be described later. As a result of the rotational movement of the gear wheel 1, a back bias magnetic field Hbb which serves as an external magnetic field applied to the main body 2 may change periodically. Details of the back bias magnetic field Hbb will be described later with reference to FIG. 5A to 5C. It is to be noted that the total number of the projections 1T or the total number of the depressions 1U in the gear wheel 1 is referred to as the number of teeth in the gear wheel 1. The gear wheel 1 may correspond to a "movable body" in one specific but non-limiting embodiment of the technology.

(Main Body 2)

The main body 2 may include the sensor unit 3, a signal processor 4, and a magnet 5, for example. The sensor unit 3 may include a sensor circuit 30, and the signal processor 4 may include a signal generating circuit 40. FIG. 2 is a circuit diagram illustrating exemplary configurations of the sensor circuit 30 and the signal generating circuit 40. As illustrated in FIG. 1, the main body 2 may also have a voltage terminal Vcc, a grounding terminal GND, and an output terminal Vout. Via the voltage terminal Vcc, a power voltage may be supplied to the sensor circuit 30. Via the output terminal Vout, an output of the signal generating circuit 40 may be obtained. In FIG. 1, a distance AG between the sensor unit 3 and the top of the adjacent projection 1T may be in a range from about 0.5 mm to about 3 mm both inclusive, for example.

(Sensor Unit 3)

The sensor circuit 30 may have a Wheatstone bridge circuit including four magneto-resistive effect (MR) devices, i.e., MR devices 3A to 3D, for example. A first end of the MR device 3A may be coupled to a first end of the MR device 3B at a node P1; a first end of the MR device 3C may be coupled to a first end of the MR device 3D at a node P2; a second end of the MR device 3A may be coupled to a second end of the MR device 3D at a node P3; and a second end of the MR device 3B may be coupled to a second end of the MR device 3C at a node P4. The node P3 may be coupled to the voltage terminal Vcc; the node P4 may be grounded; the node P1 may be coupled to the signal processor 4 via a wire L1; and the node P2 may be coupled to the signal processor 4 via a wire L2. Both the MR devices 3A and 3B may correspond to a "first sensor" in one specific but non-limiting embodiment of the technology, and both the MR devices 3C and 3D may correspond to a "second sensor" in one specific but non-limiting embodiment of the technology. The MR devices 3A and 3B, which may serve as the first sensor, may be disposed at locations different from those of the MR devices 3C and 3D, which may serve as the second sensor, in the rotational direction of the gear wheel 1 denoted by the arrow 1R.

Figure 2:
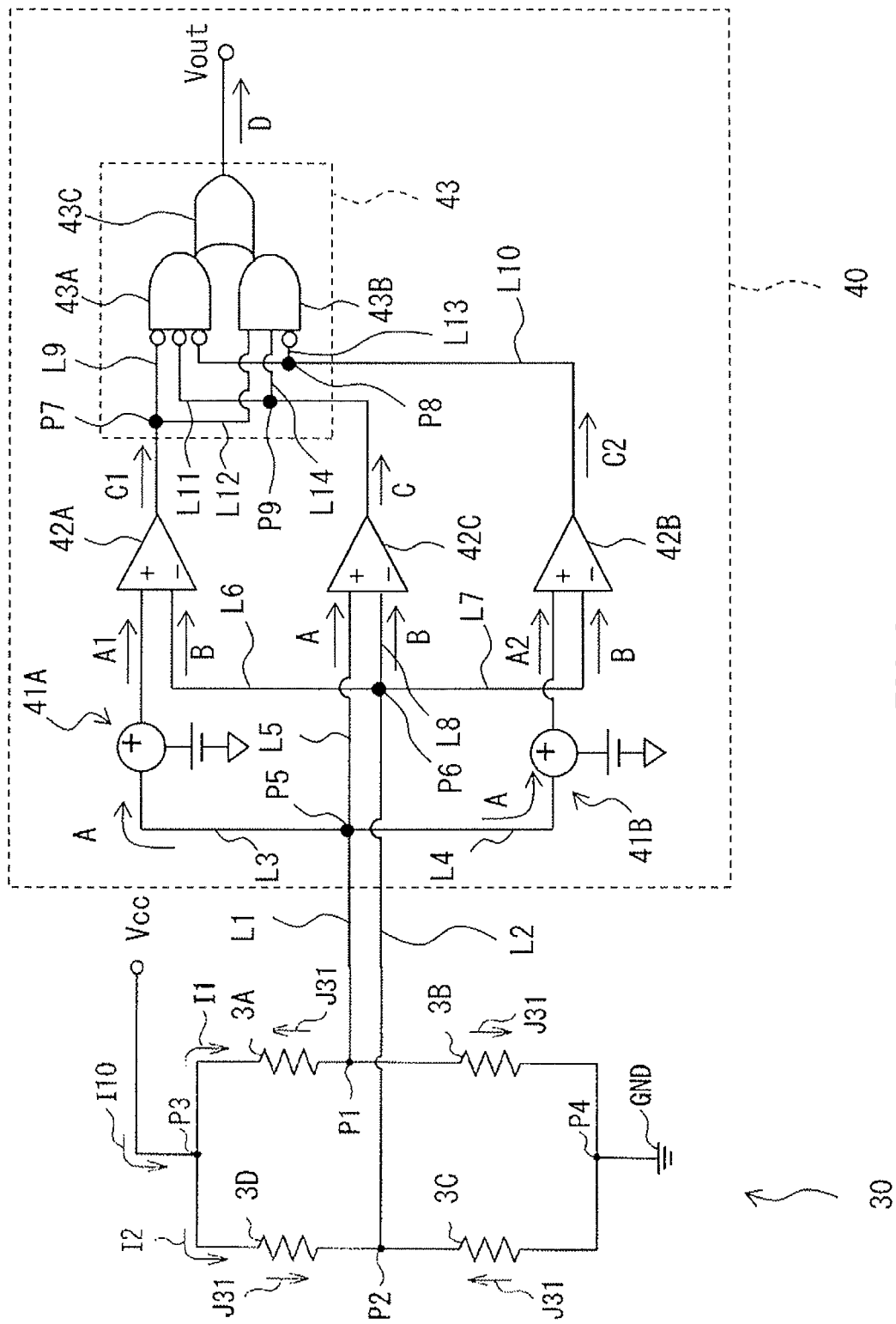
FIG. 2 is a circuit diagram of a key part of the rotation detection unit illustrated in FIG. 1.

In FIG. 2, arrows denoted by a character "J31" schematically indicate directions of magnetization of the magnetization fixed layers 31 in the respective MR devices 3A to 3D. Details of the magnetization fixed layer 31 will be described later. Specifically, resistances of both the MR devices 3A and 3C may change in a first direction with a change in the external magnetic field, and resistances of both the MR devices 3B and 3D may change in a second direction with a change in the external magnetic field. Further, the first direction is opposite to the second direction. As one example, when the resistances of the MR devices 3A and 3C increase in response to the rotation of the gear wheel 1, the resistances of the MR devices 3B and 3D may decrease.

Figure 3:
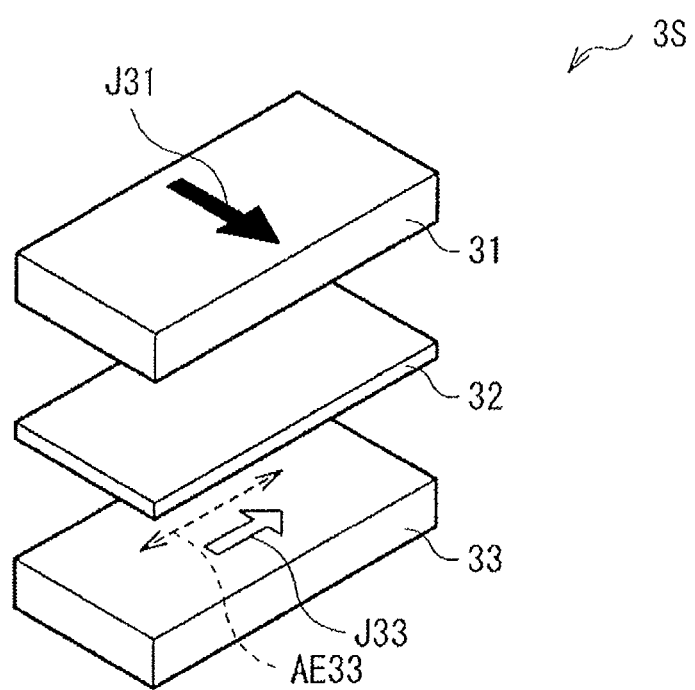
FIG. 3 is an exploded view of a configuration of a stack of each MR device illustrated in FIG. 2.

FIG. 3 illustrates an exemplary sensor stack 3S, which is a key part of each of the MR devices 3A to 3D. The sensor stacks 3S in the MR devices 3A to 3D may have substantially the same structure. As illustrated in FIG. 3, the sensor stack 3S may have a spin-valve structure in which a plurality of functional films, including a magnetic layer, are stacked. More specifically, the sensor stack 3S may include the magnetization fixed layer 31, an intermediate layer 32, and a magnetization free layer 33 in this order. The magnetization fixed layer 31 may have magnetization J31 fixed in a constant direction. The intermediate layer 32 may exhibit no magnetization in a specific direction. The magnetization free layer 33 may have magnetization J33 changing with a change in a signal magnetic field. FIG. 3 illustrates a state with no external magnetic field, or the back bias magnetic field Hbb. In other words, FIG. 3 illustrates a no load state. The direction of the magnetization J33 of the magnetization free layer 33 may be substantially parallel to its easy axis AE33 of magnetization and substantially orthogonal to the magnetization J31 of the magnetization fixed layer 31. As one example, the magnetization J31 of the magnetization fixed layer 31 in each of the MR devices 3A and 3C may be fixed in the +Y direction, whereas the magnetization J31 of the magnetization fixed layer 31 in each of the MR devices 3B and 3D may be fixed in the −Y direction. Each of the magnetization fixed layer 31, the intermediate layer 32, and the magnetization free layer 33 may have either a single-layer structure or a multi-layer structure including a plurality of layers.

The magnetization fixed layer 31 may be made of a ferromagnetic material, examples of which may include, but are not limited to, cobalt (Co), a cobalt-iron alloy (CoFe), and a cobalt-iron-boron alloy (CoFeB). An unillustrated antiferromagnetic layer may be so provided on an opposite side of the magnetization fixed layer 31 to the intermediate layer 32 that the antiferromagnetic layer is adjacent to the magnetization fixed layer 31. This antiferromagnetic layer may be made of an antiferromagnetic material, examples of which may include, but are not limited to, a platinum-manganese alloy (PtMn) and an iridium-manganese alloy (IrMn). As one example, the antiferromagnetic layer in the MR device 3A may be in a state where spin magnetic moments in the +Y and −Y directions completely cancel each other, and may fix the direction of the magnetization J31 of the adjacent magnetization fixed layer 31 in the +Y direction.

The intermediate layer 32 may be a non-magnetic tunnel barrier layer made of magnesium oxide (MgO), for example, and may be thin enough to allow a tunnel current based on quantum mechanics to flow therethrough. In this case, thus, the sensor stack 3S may have an magnetic tunnel junction (MTJ) structure, for example. The tunnel barrier layer made of MgO may be obtained through a process such as a sputtering process using a target made of MgO, a process of oxidizing a thin film made of magnesium (Mg), and a reactive sputtering process in which magnesium (Mg) is subjected to sputtering in an oxygen atmosphere, for example. Instead of MgO, the intermediate layer 32 may be made of an oxide or nitride of aluminum (Al), tantalum (Ta), or hafnium (Hf), for example. The intermediate layer 32 is not limited to the tunnel barrier layer. Alternatively, the intermediate layer 32 may be a non-magnetic electrically-conductive layer. In this case, the sensor stack 3S may have a giant magneto resistive effect (GMR) structure, for example.

The magnetization free layer 33 may be a soft ferromagnetic layer and have the easy axis AE33 of magnetization in the X-axis direction. The magnetization free layer 33 may be made of a cobalt-iron alloy (CoFe), a nickel-iron alloy (NiFe), or a cobalt-iron-boron alloy (CoFeB), for example.

When a current I10 is supplied to the Wheatstone bridge circuit in the sensor unit 3 configured above from the voltage terminal Vcc, for example, the current I10 may flow into both the MR devices 3A and 3D via the node P3. The current I10 may pass through the sensor stacks 3S in the respective MR devices 3A and 3D and then reach the nodes P1 and P2. Thereafter, the current I10 may flow into the first ends of the respective MR devices 3B and 3C from the nodes P1 and P2 and then pass through both the MR devices 3B and 3C. Thereafter, the current I10 may reach the grounding terminal GND via the node P4. The output from the bridge circuit in the sensor unit 3 from the node P1 may be transmitted as a signal A to the signal processor 4 via the wire L1. Likewise, the output from the bridge circuit in the sensor unit 3 from the node P2 may be transmitted as a signal B to the signal processor 4 via the wire L2.

(Signal Processor 4)

The signal generating circuit 40 included in the signal processor 4 may correspond to a "signal generating circuit" in one specific but non-limiting embodiment of the technology. The signal generating circuit 40 may include adders 41A and 41B, comparators 42A to 42C, and a combinational circuit 43, for example. The combinational circuit 43 may include an AND gate 43A, an AND gate 43B, and an OR gate 43C. The signal generating circuit 40 may further include a node P5 and a node P6. The wire L1 may be branched into three routes at the node P5, and the wire L2 may be branched into three routes at the node P6. The signal generating circuit 40 may further include wires L3 to L8. The node P5 may be coupled to the comparator 42A via the wire L3, to the comparator 42B via the wire L4, and to the comparator 42C via the wire L5. The node P6 may be coupled to the comparator 42A via the wire L6, to the comparator 42B via the wire L7, and to the comparator 42C via the wire L8. The adder 41A may be disposed on the wire L3 between the node P5 and the comparator 42A. The adder 41B may be disposed on the wire L4 between the node P5 and the comparator 42B.

Figure 4:
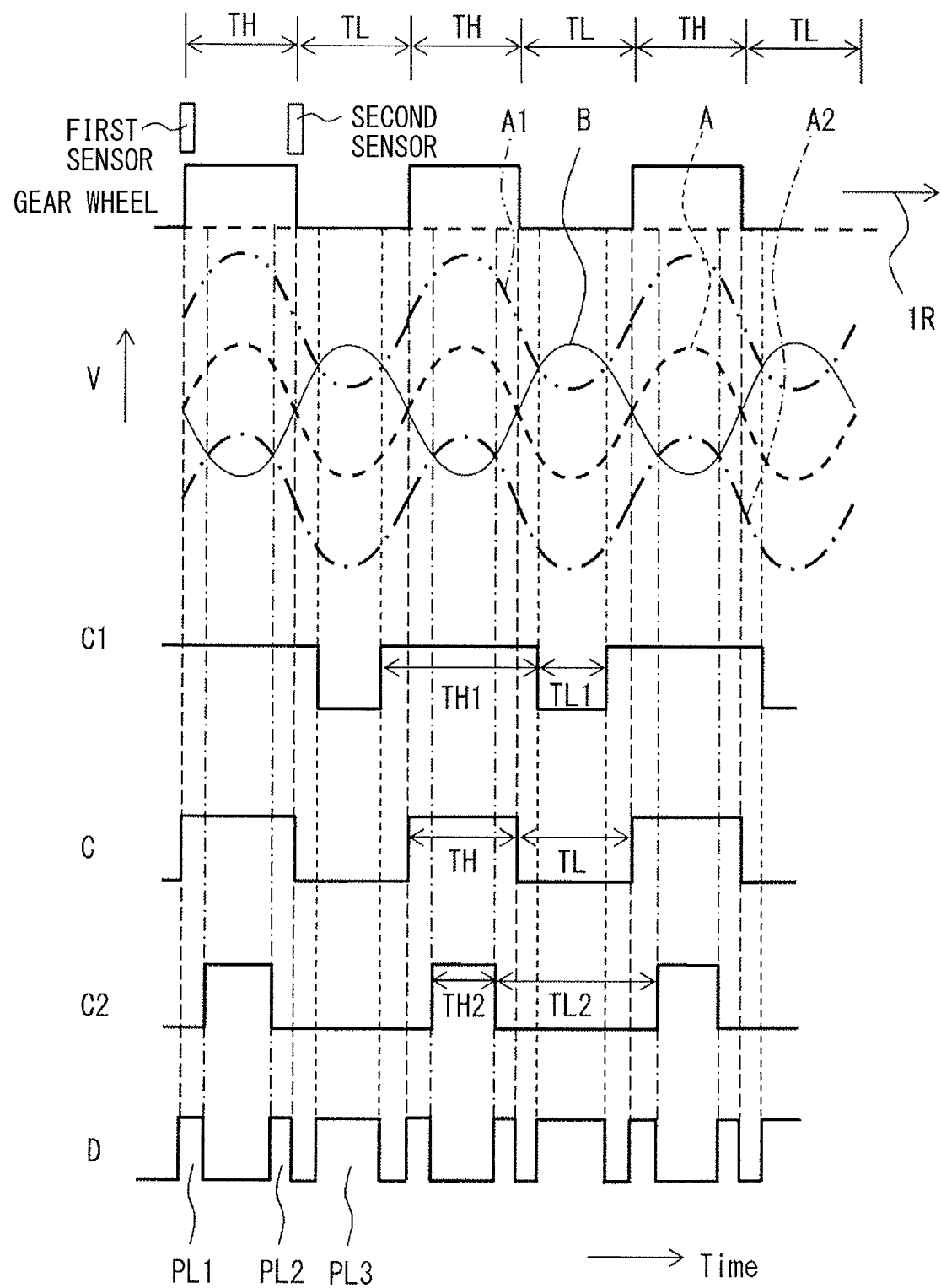
FIG. 4 is a waveform chart illustrating waveforms of signals generated in the signal processor illustrated in FIG. 1.

The adder 41A may be a logic circuit that adds a predetermined offset voltage to the signal A flowing through the wire L3, thereby generating a signal A1 and transmits the signal A1 to the comparator 42A. Likewise, the adder 41B may be a logic circuit that adds a predetermined offset voltage to the signal A flowing through the wire L4, thereby generating a signal A2 and transmits the signal A2 to the comparator 42B. In this example, the adders 41A and 41B may add, to the signal A, offset voltages different from each other, thereby generating the signals A1 and A2 having different waveforms from each other. FIG. 4 illustrates waveforms of the signals A1, A, and A2 together with a waveform of the signal B. In FIG. 4, the vertical axis associated with the signals A1, A, A2, and B represents a magnitude of a voltage V. FIG. 4 also illustrates locations of the projections 1T and the depressions 1U in the gear wheel 1, a location of the MR devices 3A and 3B, and a location of the MR devices 3C and 3D. The MR devices 3A and 3B may be hereinafter collectively referred to as the "first sensor", and the MR devices 3C and 3D may be hereinafter collectively referred to as the "second sensor". In this example, the adder 41A may preferably add the offset voltage, to the signal A, in a range in which the waveform of the signal A1 intersects the waveform of the signal B. Likewise, the adder 41B may preferably add the offset voltage, to the signal A, in a range in which the waveform of the signal A2 intersects the waveform of the signal B.

Each of the comparators 42A to 42C may be a logic circuit that compares logic values (voltages, in this example) of two input signals, and outputs a new signal based on a magnitude relationship between the voltages of the input signals. More specifically, the comparator 42A may compare the signal B with the signal A1 to which the offset voltage has been added and output a signal C1 based on the comparison result. Likewise, the comparator 42B may compare the signal B with the signal A2 to which the offset voltage has been added and output a signal C2 based on the comparison result. The comparator 42C may compare the signal B with the signal A to which no offset voltage has been added and output a signal C based on the comparison result. FIG. 4 illustrates waveforms of the respective signals C1, C, and C2. In FIG. 4, the voltage of any of the signals A1, A, and A2 corresponds to a high level (Hi) when higher than the voltage of the signal B, and corresponds to a low level (Lo) when lower than the voltage of the signal B.

The signal generating circuit 40 may further include a wire L9, a wire L10, and a wire L11. The wire L9 may extend from the comparator 42A to the AND gate 43A. The wire L10 may extend from the comparator 42B to the AND gate 43A. The wire L11 may extend from the comparator 42C to the AND gate 43A. Disposed on the wire L9 may be a node P7 coupled to the AND gate 43B via a wire L12. Disposed on the wire L10 may be a node P8 coupled to the AND gate 43B via a wire L13. Disposed on the wire L11A may be a node P9 coupled to the AND gate 43B via a wire L14. In the combinational circuit 43, after the signals C1, C, and C2 are supplied to both the AND gates 43A and 43B, the outputs of the AND gates 43A and 43B may be supplied to the AND gate 43C, thereby causing a signal D to be output from the output terminal Vout. FIG. 4 illustrates a waveform of the signal D.

(Magnet 5)

The magnet 5 may be positioned on an opposite side of the sensor unit 3 to the gear wheel 1. The magnet 5 may apply the back bias magnetic field Hbb (see FIG. 5A to FIG. 5C described later) in the +Z direction to both the gear wheel 1 and the sensor unit 3. The sensor unit 3 may detect a change in the back bias magnetic field Hbb using the MR devices 3A to 3D. More specifically, the sensor unit 3 may detect a change in an X component contained in the back bias magnetic field Hbb.

[Operation and Working of Rotation Detection Unit]

The rotation detection unit of the present embodiment may be able to detect a speed of a rotation of the gear wheel 1, using the sensor unit 3, the signal processor 4, and the magnet 5 contained in the main body 2.

Figure 5A:
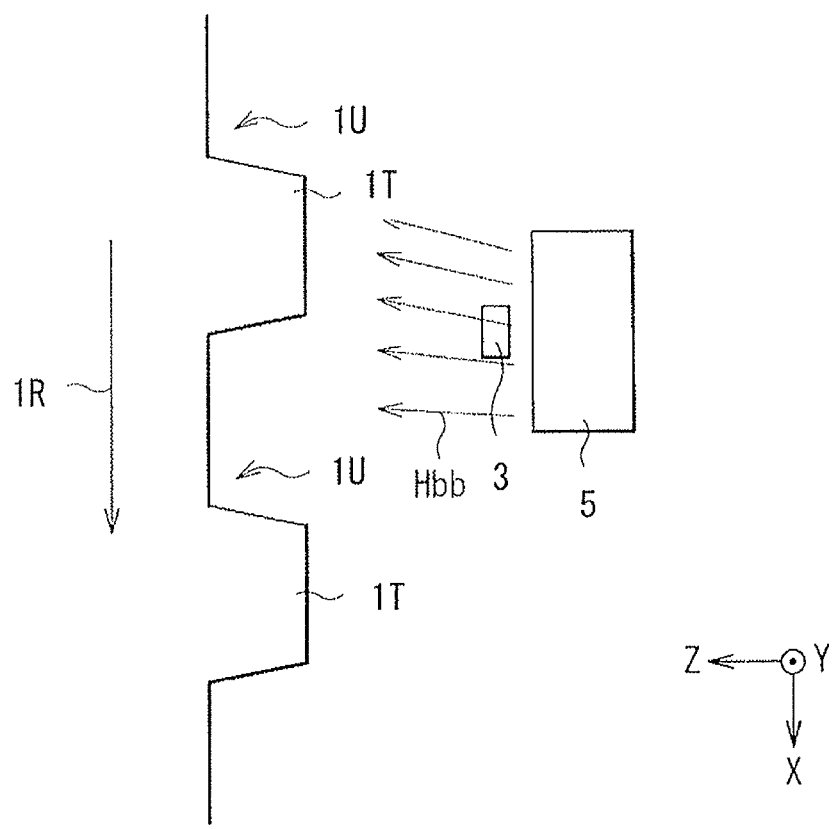
FIG. 5A is a first enlarged view of a key part of the rotation detection unit illustrated in FIG. 1 and illustrates an operation thereof.
Figure 5B:
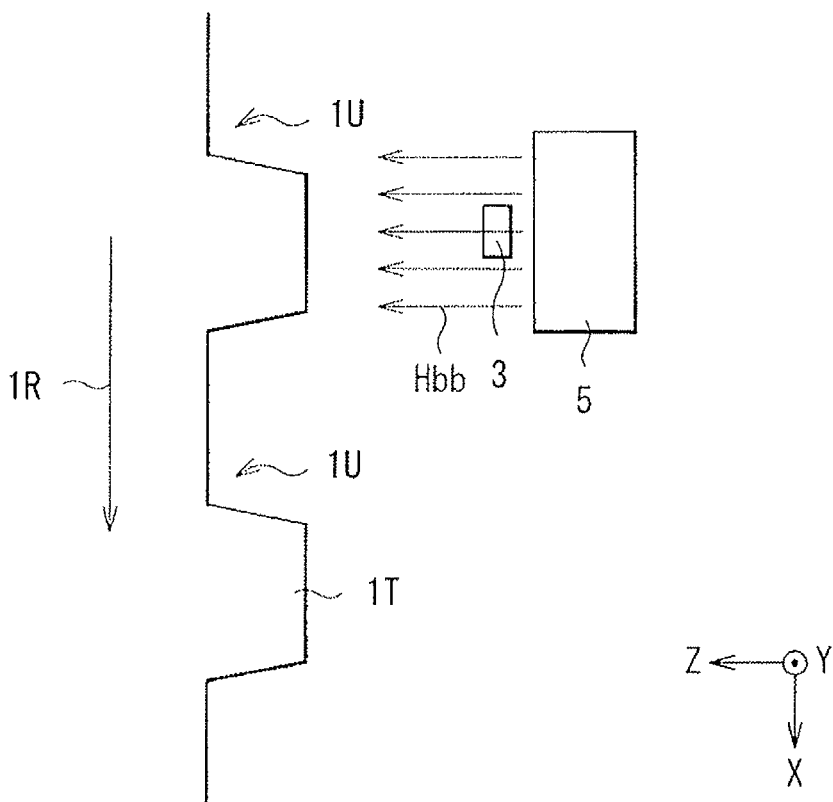
FIG. 5B is a second enlarged view of the key part of the rotation detection unit illustrated in FIG. 1 and illustrates an operation thereof.
Figure 5C:
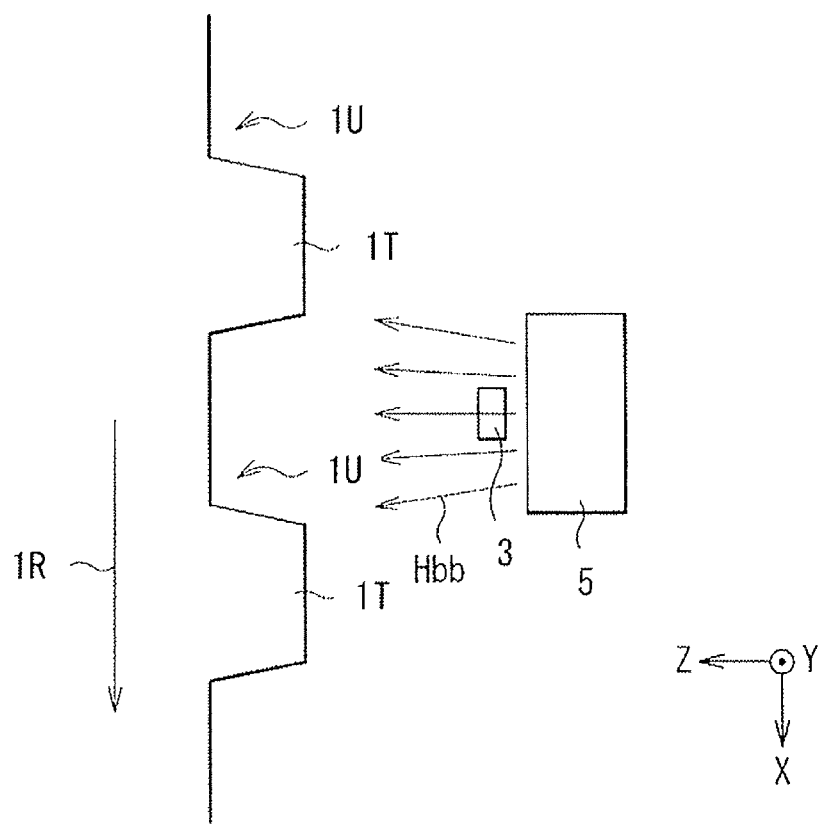
FIG. 5C is a third enlarged view of the key part of the rotation detection unit illustrated in FIG. 1 and illustrates an operation thereof.

When the gear wheel 1 that has been in the state of FIG. 5A rotates in the direction denoted by the arrow 1R, for example, the projections 1T and the depressions 1U in the gear wheel 1 may alternately face the MR devices 3A to 3D in the sensor unit 3 of the rotation detection unit. In this case, when the projection 1T, made of a magnetic body, approaches the sensor unit 3 as illustrated in FIG. 5B, for example, the magnetic flux of the back bias magnetic field Hbb given by the magnet 5 positioned behind the sensor unit 3 may concentrate on this projection 1T. In this case, the magnetic flux may spread out to an small extent in the X-axis direction, so that the X component contained in the back bias magnetic field Hbb becomes relatively small. In contrast, when the projection 1T is away from the sensor unit 3 and in turn the depression 1U approaches the sensor unit 3 as illustrated in FIG. 5C, for example, a part of the magnetic flux of the back bias magnetic field Hbb may be directed to the projections 1T on both sides of the depression 1U. In this case, the magnetic flux may spread out to a large extent in the X-axis direction, so that the X component contained in the back bias magnetic field Hbb becomes relatively great. With this change in the X component contained in the back bias magnetic field Hbb, the direction of the magnetization J33 of the magnetization free layer 33 in each of the MR devices 3A to 3D may change. This change in the direction of the magnetization J33 may cause resistances of the MR devices 3A to 3D to change. By making use of these changes in the resistances of the MR devices 3A to 3D, the rotation detection unit may detect the speed of the rotation of the gear wheel 1.

A detailed description will be given below of an operation of detecting the rotation of the gear wheel 1, with reference to FIG. 4 and some other drawings. In FIG. 4, the character TH denotes a period over which any of the projections 1T moves from a location nearest to the first sensor to a location nearest to the second sensor when the gear wheel 1 rotates. Likewise, the character TL denotes a period over which any of the depressions 1U moves from a location nearsest to the first sensor to a location nearest to the second sensor. FIG. 4 illustrates an example case in which the gear wheel 1 rotates in the direction denoted by the arrow 1R, relative to both the first and second sensors. In FIG. 4, the horizontal axis represents the passage of time, and the passage of time becomes greater in a rightward direction of the horizontal axis.

As described above, as the projection 1T approaches the sensor unit 3, the magnetic flux of the back bias magnetic field Hbb from the magnet 5 may concentrate on the projection 1T more greatly, so that the X component contained in the back bias magnetic field Hbb decreases. In contrast, as the depression 1U approaches the sensor unit 3, a part of the magnetic flux of the back bias magnetic field Hbb may be directed to the projections 1T on both sides of the depression 1U, so that the X component contained in the back bias magnetic field Hbb increases. As a result, the signal B on the wire L2 may exhibit a curve as indicated by the character B in FIG. 4. More specifically, within the period TH, the voltage of the signal B may gradually decrease to the minimum value and then gradually increase from the minimum value. Further, within the period TL, the voltage of the signal B may gradually increase to the maximum value and then gradually decrease from the maximum value. The signal A on the wire L1 may exhibit a curve as indicated by the character A in FIG. 4. More specifically, within the period TH, the voltage of the signal A may gradually increase to the maximum value and then gradually decrease from the maximum value. Further, within the period TL, the voltage of the signal A may gradually decrease to the minimum value and then gradually increase from the minimum value.

The signal A and the signal B may be supplied directly to the comparator 42C via the wires L5 and L8, respectively. The comparator 42C having the foregoing configuration may compare the signals A and B and output the signal C having a pulse waveform based on the comparison result. More specifically, over the period TH, the voltage of the signal A may be higher than that of the signal B, in which case the comparator 42C may output the signal C of a high level (Hi). Over the period TL, the voltage of the signal A may be lower than that of the signal B, in which case the comparator 42C may output the signal C of a low level (Lo) (see FIG. 4).

The signal A may be supplied to the adder 41A via the wire L3 branched from the wire L1 at the node P5. The adder 41A may add the offset voltage to the signal A, thereby generating the new signal A1. The signal A1 may be supplied to the comparator 42A. The signal B may be supplied to the comparator 42A via the wire L6 branched from the wire L2 at the node P6. The comparator 42A may compare the signals A1 and B and output the signal C1 having a pulse waveform based on the comparison result. Since the offset voltage is added to the signal A1, the points at which the waveforms of the signal A1 and B intersect each other may be different in location from the points at which the waveforms of the signals A and B intersect each other. More specifically, a period over which the voltage of the signal A1 is higher than that of the signal B may be longer than the period TH. Further, a period over which the voltage of the signal A1 is lower than that of the signal B may be shorter than the period TL. Consequently, a period TH1 over which the signal C1 is at a high level (Hi) may become longer than the period TH, whereas a period TL1 over which the signal C1 is at a low level (Lo) may become shorter than the period TL (see FIG. 4).

The signal A may be also supplied to the adder 41B via the wire L4 branched from the wire L1 at the node P5. The adder 41B may add, to the signal A, the offset voltage different from that added to the signal A by the adder 41A, thereby generating the new signal A2. The signal A2 may be supplied to the comparator 42B. In contrast, the signal B may be also supplied to the comparator 42B via the wire L7 branched from the wire L2 at the node P6. The comparator 42B may compare the signals A2 and B and output the signal C2 having a pulse waveform based on the comparison result. Since the predetermined offset voltage is added to the signal A2, points at which the waveforms of the signals A2 and B intersect each other may be different in location from the intersection points of the waveforms of the signals A and B and the intersection points of the waveforms of the signals A1 and B. More specifically, a period over which the voltage of the signal A2 is higher than that of the signal B may be shorter than the period TH. Further, a period over which the voltage of the signal A2 is lower than that of the signal B may be longer than the period TL. Consequently, a period TH2 over which the signal C2 is at a high level (Hi) may be shorter than the period TH, and a period TL2 over which the signal C2 is at a low level (Lo) may be longer than the period TL (see FIG. 4).

In the signal generating circuit 40, after the signals C1, C, and C2 have been generated in the above manner, the combinational circuit 43 may generate a signal D to be output via the output terminal Vout. As illustrated in FIG. 4, the signal D may contain a plurality of pulses (pulses PL1 and PL2) within the period TH.

[Effect of Rotation Detection Unit]

The foregoing configuration enables the rotation detection unit in the present embodiment to output the signal D containing the plurality of pulses when the single projection 1T passes between the first and second sensors. One reason for this is that, the signal processor 4 generates the signals A1 and A2 having different waveforms on the basis of the signal A, and the comparators 42A and 42B generate the signals C1 and C2 having different waveforms, respectively.

If the signal processor does not generate the signals A1 and A2, only the signal C containing a single pulse is obtainable when the single projection 1T and the single depression 1U pass between the first and second sensors. In contrast, the signal D containing the three pulses PL1 to PL3 is obtainable when the single projection 1T and the single depression 1U pass between the first and second sensors.

According to the rotation detection unit in the foregoing first embodiment, the signal processor 4 is provided. This allows the number of pulses to be greater than the number of pulses obtainable from only a relationship between the signals A and B. This makes it possible to detect an extremely small rotation of the gear wheel 1 with high precision.

2. Modification of First Embodiment

In the foregoing first embodiment, the signal D illustrated in FIG. 4 contains the pulses PL1, PL2, and PL3. Further, the pulses PL1 and PL2 are different in width from the pulse PL3. In addition, the interval from the pulse PL1 to the pulse PL2 is also different from the interval from the pulse PL2 to the pulse PL3. This pulse configuration of the signal D may involve a complicated numerical process in order to determine a rotation speed and rotation angle of the gear wheel 1.

Figure 6:
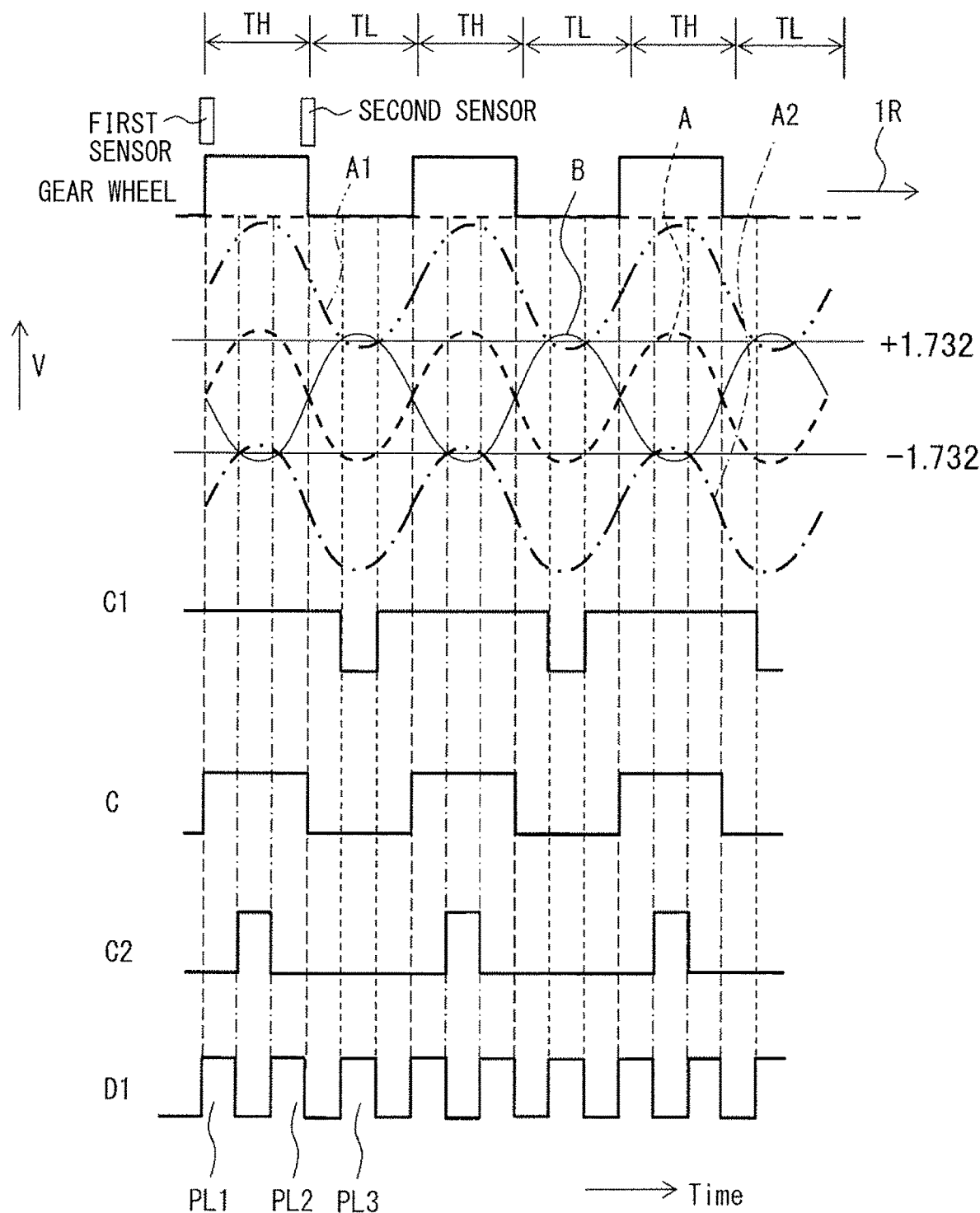
FIG. 6 is a waveform chart according to a modification of the rotation detection unit illustrated in FIG. 1.

To address the foregoing matter, for example, it may be preferable to obtain, from the combinational circuit 43 in the signal generating circuit 40, a signal D1 in which a plurality of pulses having substantially the same width are provided at substantially equal intervals, for example, as illustrated in FIG. 6. The foregoing signal D1 may be obtained by adjusting the offset voltages to be added to the signal A by the adders 41A and 41B. As one specific example, an amplitude of the voltages of the signals A and B may be ±1 V. In this case, the adder 41A may add an offset voltage V1 of about +1.732 V (=−2×sin 240°=−2×sin 300°) to the signal A when generating the signal A1. Likewise, the adder 41B may add an offset voltage V2 of about −1.732 V (=−2×sin 60°=−2×sin 120°) to the signal A when generating the signal A2. By adjusting the offset voltages in this manner, when the waveform of the signal A intersects the waveform of the signal B at points of about 0° and 180°, the waveform of the signal A1 may intersect the waveform of the signal B at points of about 240° and 300°, and the waveform of the signal A2 may intersect the waveform of the signal B at points of about 60° and 120°. As a result, when the single projection 1T and the single depression 1U pass between the first and second sensors, the combinational circuit 43 may generate the three pulses each having a width of about 60° at intervals of about 60°.

By outputting, from the signal processor 4, the signal D1 having a duty ratio of about 0.5 in which the plurality of pulses each having substantially the same width are provided at substantially equal intervals as described above, it is possible to easily determine the rotation speed and the rotation angle of the gear wheel 1.

3. Second Embodiment

[Configuration and Operation of Rotation Detection Unit]

Figure 7:
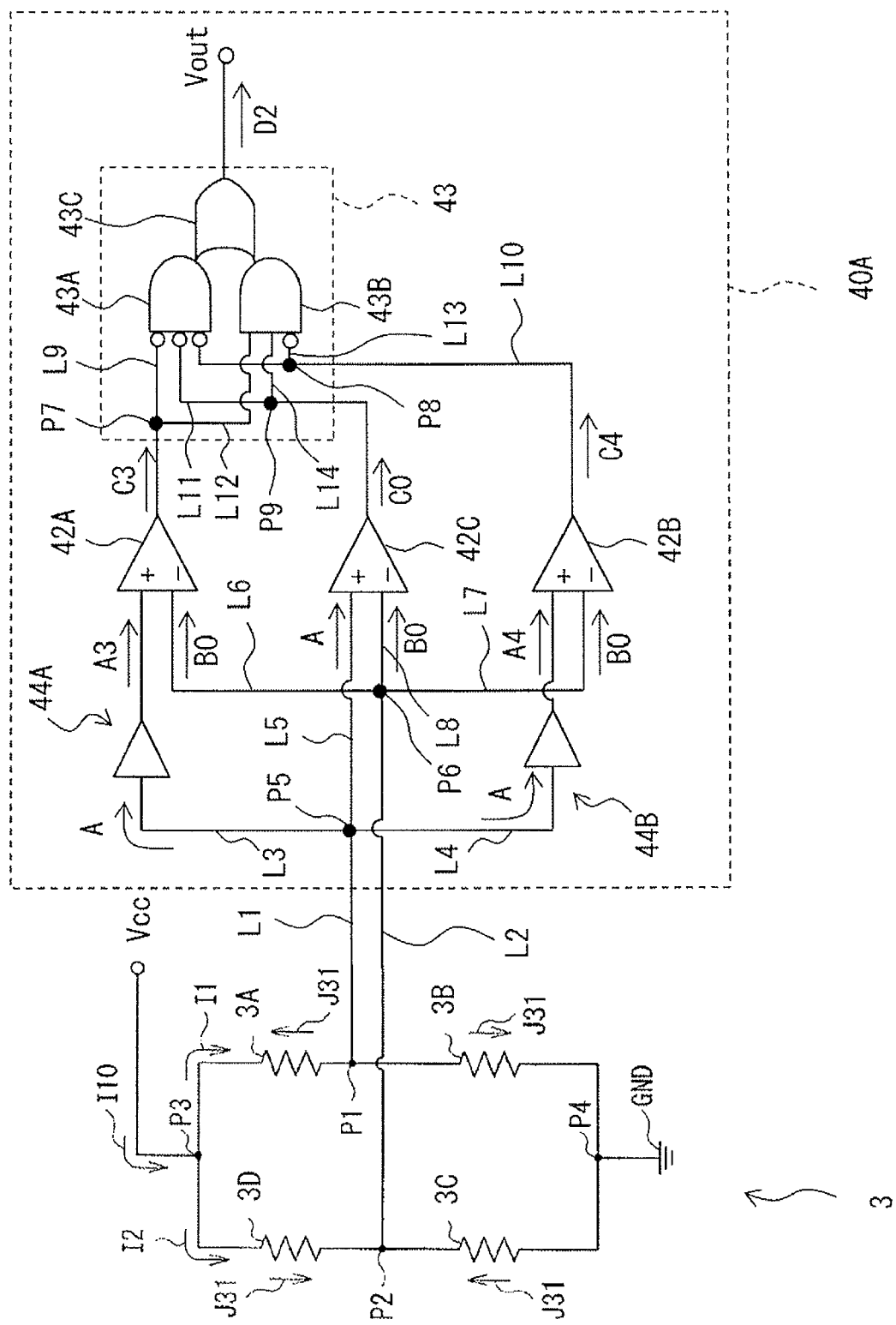
FIG. 7 is a circuit diagram illustrating a configuration of a key part of a rotation detection unit according to a second embodiment of the technology.

Next, a description will be given below of a rotation detection unit in a second embodiment of the technology, with reference to FIG. 7. FIG. 7 is a circuit diagram illustrating an exemplary configuration of a signal generating circuit 40A in the rotation detection unit in the second embodiment. In the foregoing first embodiment, the signal generating circuit 40 includes the adder 41A that generates the new signal A1 and the adder 41B that generates the new signal A2. In the second embodiment, however, the signal generating circuit 40A may include an amplifier 44A and an amplifier 44B, instead of the adders 41A and 41B. The amplifier 44A may generate a new signal A3 based on the signal A, whereas the amplifier 44B may generate a new signal A4 based on the signal A. Furthermore, the signal generating circuit 40A may receive a signal B0 from the sensor unit 3. A phase difference between the signals A and B0 may be set to any value other than 180°. Except for this, the signal generating circuit 40A may have substantially the same configuration as that of the signal generating circuit 40. Hereinafter, components that are substantially the same as those in the foregoing first embodiment are denoted with identical characters and will not be described where appropriate.

Figure 8:
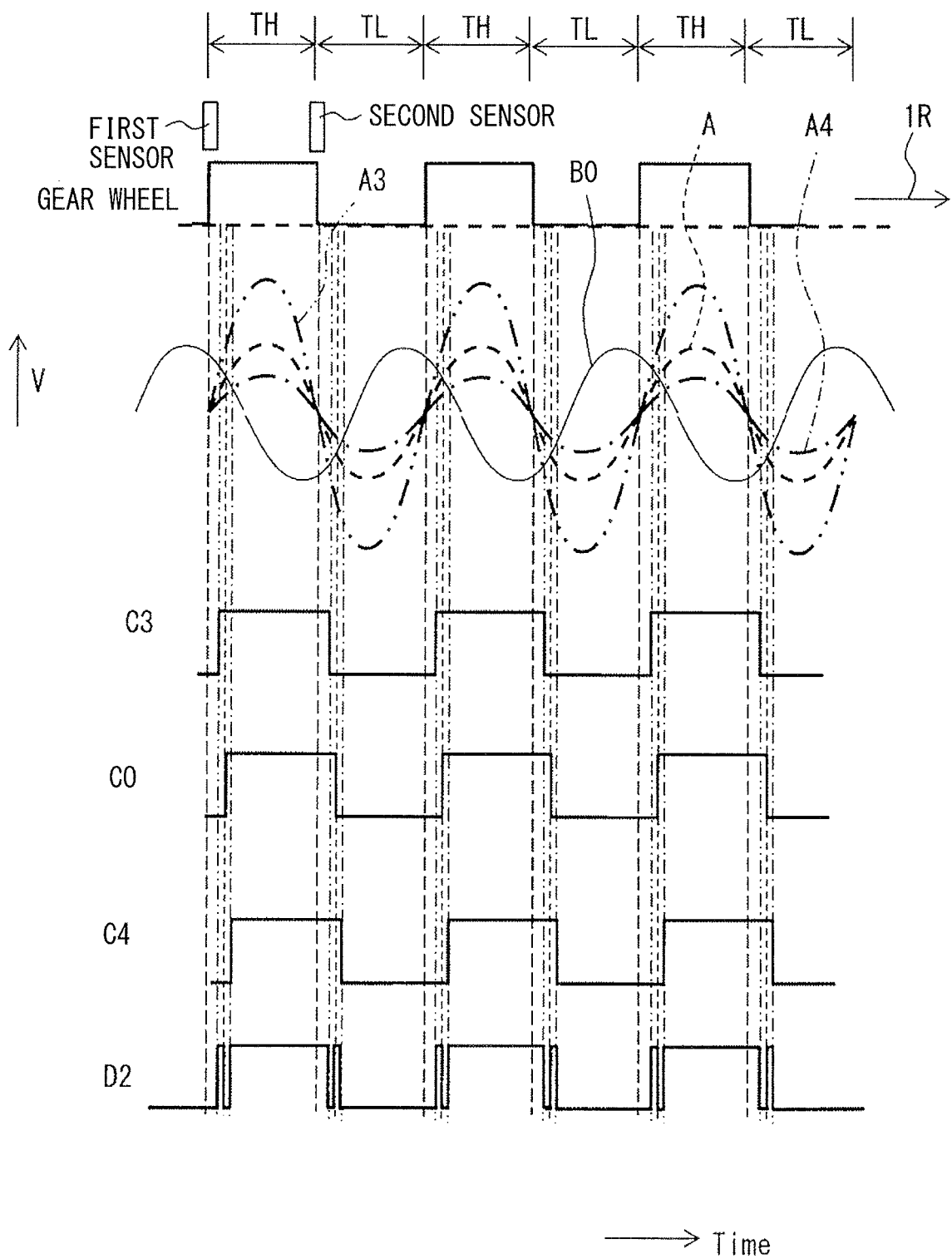
FIG. 8 is a waveform chart illustrating waveforms of signals generated in the signal processor illustrated in FIG. 7.

The amplifier 44A may be an amplifier circuit disposed on the wire L3 that couples the node P5 to the comparator 42A. The amplifier 44A may amplify the voltage of the signal A flowing through the wire L3 within a predetermined range, thereby generating the signal A3. The amplifier 44A may transmit the signal A3 to the comparator 42A. Likewise, the amplifier 44B may be an amplifier circuit disposed on the wire L4 that couples the node P5 to the comparator 42B. The amplifier 44B may amplify the voltage of the signal A flowing through the wire L4 within a predetermined range, thereby generating the signal A4. The amplifier 44B may transmit the signal A4 to the comparator 42B. In this example, it may be preferable that a ratio at which the amplifier 44A amplifies the signal A be different from that of the amplifier 44B, so that the signals A3 and A4 have different waveforms from each other. FIG. 8 illustrates waveforms of the signals A3, A, and A4 together with a waveform of the signal B0.

The comparator 42A may compare the signal A3 after the amplification with the signal B0, and output a signal C3 based on the comparison result. Likewise, the comparator 42B may compare the signal A4 after the amplification with the signal B0, and output a signal C4 based on the comparison result. The comparator 42C may compare the non-amplified signal A with the signal B0, and output a signal C0 based on the comparison result. FIG. 8 illustrates waveforms of the signals C3, C0, and C4.

The signals C3, C0, and C4 generated in the above manner may be supplied to both the AND gate 43A and the AND gate 43B in the combinational circuit 43. Thereafter, outputs of the AND gates 43A and 43B may be supplied to the OR gate 43C, following which the OR gate 43C may output a signal D2 from the output terminal Vout. FIG. 8 illustrates a waveform of the signal D2.

[Effect of Rotation Detection Unit]

According to the rotation detection unit in the second embodiment, the amplifier 44A and the amplifier 44B generate the two signals, i.e., the signal A3 and the signal A4, respectively, based on the signal A and having waveforms different from each other. Therefore, the second embodiment achieves similar effects as those of the foregoing first embodiment.

4. Other Modifications

The technology has been described above referring to some embodiments and the modifications thereof. However, the technology is not limited thereto and may be varied in various ways. As one example, in the embodiments and the modifications thereof, the signal generating circuit generates a plurality of new signals from single signal using adders or amplifiers. However, these configurations may be exemplary and not limitative.

Figure 9:
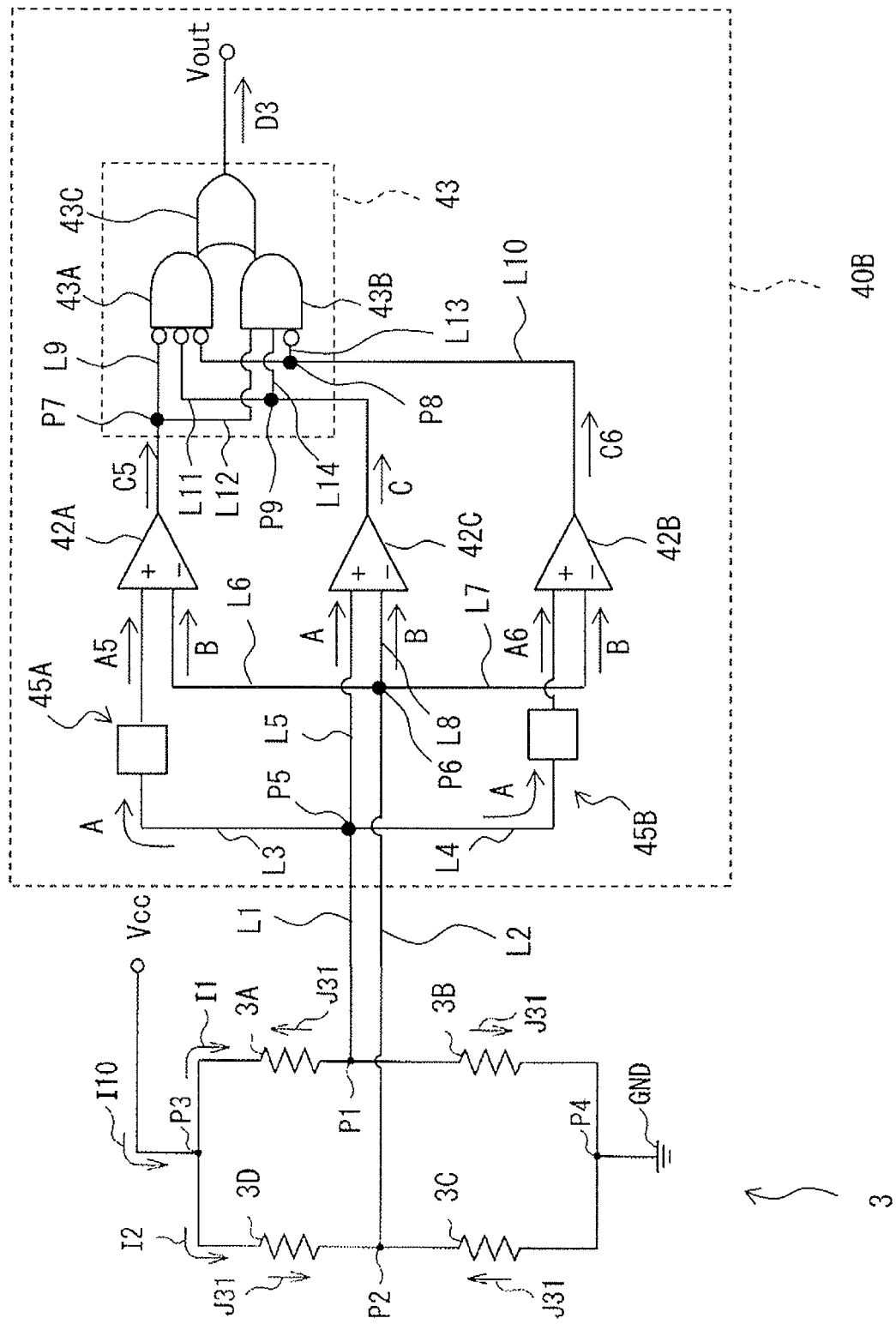
FIG. 9 is a circuit diagram of a signal processor according to another modification of the first and second embodiments of the technology.
Figure 10:
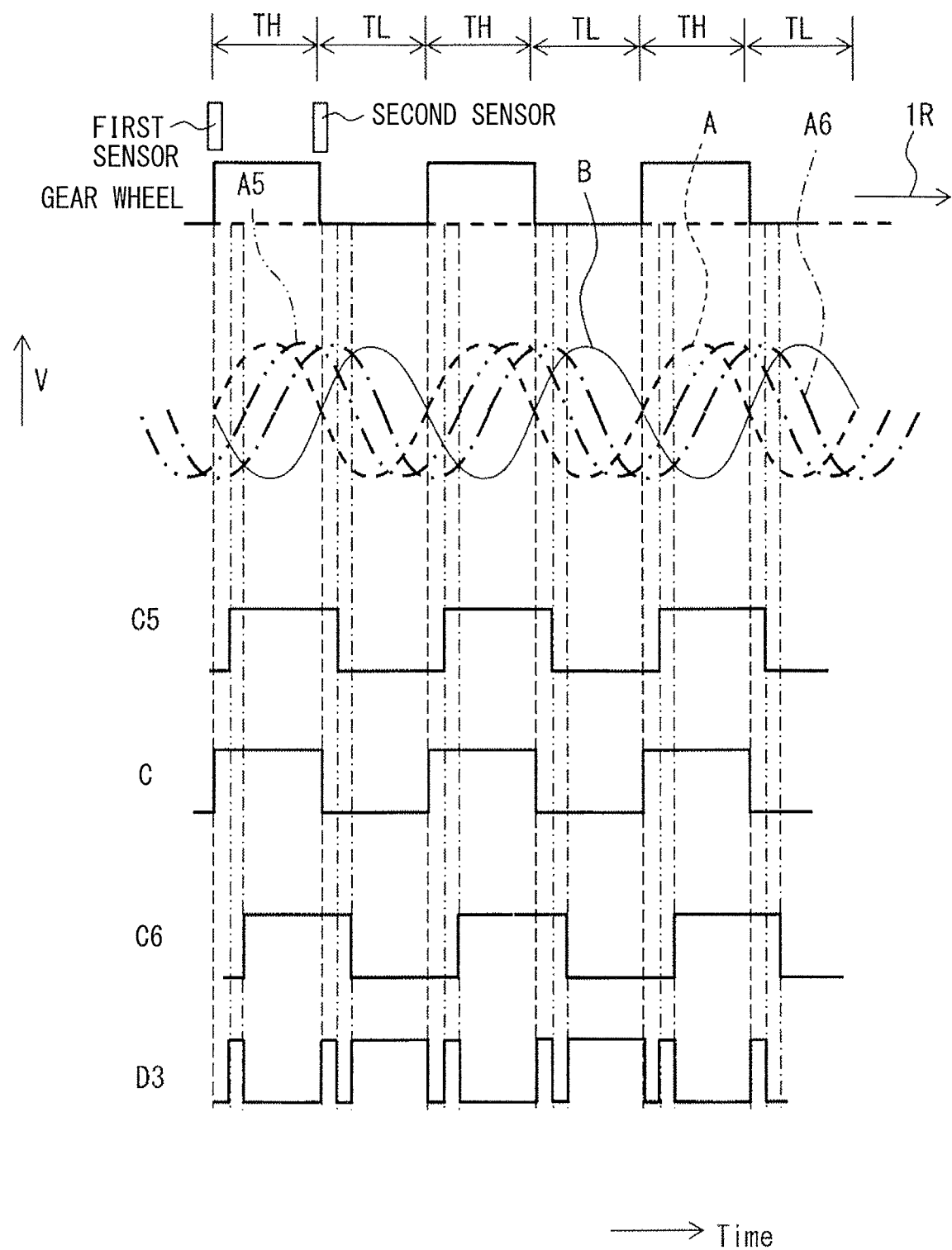
FIG. 10 is a waveform chart illustrating waveforms of signals generated in the signal processor illustrated in FIG. 9.

As one alternative example, a signal generating circuit 40B may include a phase shift circuit 45A that generates a new signal A5 based on the signal A and a phase shift circuit 45B that generates a new signal A6 based on the signal A, as illustrated in FIG. 9. The phase shift circuit 45A may be a phase control circuit that includes a coil, a capacitor, and other electrical components and be disposed on the wire L3 coupling the node P5 to the comparator 42A. The phase shift circuit 45A may generate the signal A5 by providing a predetermined temporal shift (delay) to the signal A flowing through the wire L3, and then transmit the signal A5 to the comparator 42A. Likewise, the phase shift circuit 45B may be a phase control circuit that includes a coil, a capacitor, and other electrical components and be disposed on the wire L4 coupling the node P5 to the comparator 42B. The phase shift circuit 45B may generate the signal A6 by providing a predetermined temporal shift (delay) to the signal A flowing through the wire L4, and transmit the signal A6 to the comparator 42B. In this example, the phase shift circuits 45A and 45B may delay the signal A by time perods different from each other, thereby generating the signals A5 and A6 having waveforms with different phases from each other. FIG. 10 illustrates waveforms of the signals A5, A, and A6 together with the waveform of the signal B.

The comparator 42A may compare the signal A5 that has been subjected to the phase shift with the signal B, and output a signal C5 based on the comparison result. Likewise, the comparator 42B may compare the signal A6 that has been subjected to the phase shift with the signal B, and output a signal C6 based on the comparison result. Likewise, the comparator 42C may compare the signal A that has been subjected to no phase shift with the signal B, and output the signal C based on the comparison result. FIG. 10 illustrates waveforms of the signals C5, C, and C6.

Further, in the combinational circuit 43, the signals C5, C0, and C6 generated in the above manner may be supplied to both the AND gate 43A and the AND gate 43B. Thereafter, outputs of the AND gates 43A and 43B may be supplied to the OR gate 43C, following which the OR gate 43C may output a signal D3 from an output terminal Vout. FIG. 10 illustrates the waveform of the signal D3.

In the present example, the signals A5, A, and A6 may intersect the signal B at points temporally different from each other. This makes it possible to output the signal D3 containing the plurality of pulses when the single projection 1T passes between the first sensor and the second sensor. Therefore, it is possible to achieve effects similar to those of the foregoing embodiments and the modifications thereof.

Moreover, instead of circuits such as the adders, the amplifiers, and the phase shift circuits, a multiply circuit may be provided in the signal processor in order to generate a plurality of new signals having different frequencies from a single signal.

In the foregoing embodiments and the modifications thereof, an analog circuit is described as an example of the signal processor. However, this circuit configuration may be exemplary and not limitative. Alternatively, the signal processor may be a digital circuit. In this example, for example, a digital comparator may be used as a comparator, and a pulse generator may be used instead of the combinational circuit. In this case, an analog signal from a sensor may be converted into a digital signal by a circuit such as an A/D comparator, for example, to be supplied to the signal processor.

In the foregoing embodiments and the modifications thereof, the signal processor generates three new signals (e.g., the signals A, A1, and A2) on the basis of the signal A from the first sensor. However, the number of new signals generated may be exemplary and not limited to three. Alternatively, the number of new signals may be two, or four or more.

Figure 11:
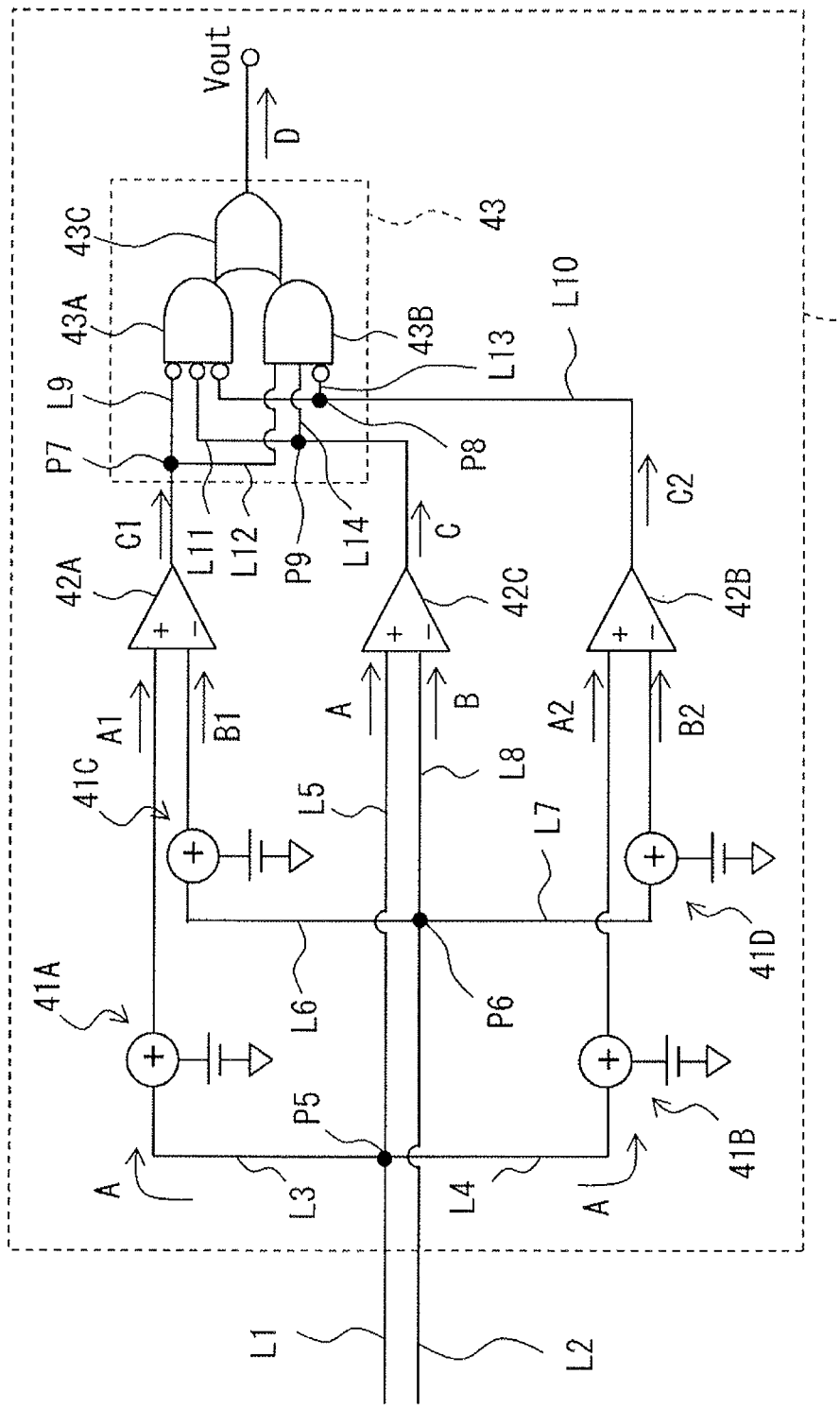
FIG. 11 is a circuit diagram of a signal processor in still another modification of the first and second embodiment.

The signal processor may generate a plurality of new signals Bn (B1, B2, . . . Bn) on the basis of only the signal B from the second sensor. Alternatively, the signal processor may generate a plurality of new signals Am (A1, A2, . . . Am) on the basis of the signal A from the first sensor and may also generate the plurality of new signals Bn (B1, B2, . . . Bn) on the basis of the signal B from the second sensor. FIG. 11 illustrates a signal generating circuit 40C as a specific example thereof. As illustrated in FIG. 11, the signal generating circuit 40C may further include an adder 41C and an adder 41D. The adder 41C may be disposed between the node P6 and the comparator 42A and generate a new signal B1 on the basis of the signal B. The adder 41D may be disposed between the node P6 and the comparator 42B and generate a new signal B2 on the basis of the signal B. Except for this, the signal generating circuit 40C may have a configuration substantially the same as that of the signal generating circuit 40.

Moreover, according to the technology, the number of sensors is not limited to two or four, and may be any number that is two or greater.

In the foregoing embodiments and the modifications thereof, the gear wheel, which serves as the movable body, has a disc-shaped member with a circumference on which projections and depressions are alternately disposed. However, this configuration may be exemplary and is not limitative. As one alternative example, the movable body may have a disc-shaped or circular member with a circumference on which a ferromagnetic part is provided. The ferromagnetic part may be provided with S-pole regions and N-pole regions that are alternately disposed at predetermined intervals. In the foregoing embodiments and the modifications thereof, a rotation detection unit, which serves as a movement detection unit, includes a rotating body. However, the rotating body may be exemplary and is not limitative. Specifically, the movable body is not limited to the rotating body as described above. Alternatively, for example, the movable body may be a member that linearly extends in one direction. The movement detection unit according to one embodiment of the technology may detect a movement, of this linear movable body, in its extending direction.

It should be understood by those skilled in the art that various modifications, combinations, sub-combinations and alterations may occur depending on design requirements and other factors insofar as they are within the scope of the appended claims or the equivalents thereof.

It is possible to achieve at least the following configurations from the above-described example embodiments of the technology.

(1)

A movement detection unit including:

a movable body that performs a movement in a first direction;

a first sensor that detects a first magnetic field change which is caused by the movement of the movable body and outputs a first signal;

a second sensor provided in the first direction at a location different from a location of the first sensor, the second sensor detecting a second magnetic field change which is caused by the movement of the movable body and outputting a second signal; and a signal processor including a signal generating circuit that generates a third signal and a fourth signal on a basis of the first signal, the third signal and the fourth signal having waveforms different from each other.

(2)

The movement detection unit according to (1), wherein the movable body includes a gear teeth part having a plurality of projections and a plurality of depressions that are alternately disposed, and the signal generating circuit further includes a pulse generator that generates a plurality of pulses within a period in which one of the projections or one of the depressions passes by both the first sensor and the second sensor.

(3)

The movement detection unit according to (1), wherein the movable body includes a ferromagnetic part having a plurality of N-pole regions and a plurality of S-pole regions that are alternately provided, and the signal generating circuit further includes a pulse generator that generates a plurality of pulses within a period in which one of the N-pole regions or one of the S-pole regions passes by both the first sensor and the second sensor.

(4)

The movement detection unit according to (1), wherein the signal generating circuit further includes:

a first comparator that outputs a fifth signal on a basis of a comparison between the third signal and the second signal;

a second comparator that outputs a sixth signal on a basis of a comparison between the fourth signal and the second signal; and a pulse generator that combines the fifth signal and the sixth signal and thereby generates a seventh signal containing a plurality of pulses.

(5)

The movement detection unit according to (4), wherein the movable body includes a gear teeth part having a plurality of projections and a plurality of depressions that are alternately disposed, and the pulse generator generates the plurality of pulses within a period in which one of the projections or one of the depressions passes by both the first sensor and the second sensor.

(6)

The movement detection unit according to (4), wherein the movable body includes a ferromagnetic part having a plurality of N-pole regions and a plurality of S-pole regions that are alternately provided, and the pulse generator generates the plurality of pulses within a period in which one of the N-pole regions or one of the S-pole regions passes by both the first sensor and the second sensor.

(7)

The movement detection unit according to (1), wherein the signal generating circuit further generates an eighth signal and a ninth signal on a basis of the second signal, the eighth signal and the ninth signal having waveforms different from each other.

(8)

The movement detection unit according to (7), wherein the signal generating circuit further includes:

a third comparator that outputs a tenth signal on a basis of a comparison between the third signal and the eighth signal;

a fourth comparator that outputs an eleventh signal on a basis of a comparison between the fourth signal and the ninth signal; and a pulse generator that combines the tenth signal and the eleventh signal and thereby generates a twelfth signal containing a plurality of pulses.

(9)

The movement detection unit according to any one of (1) to (8), wherein the signal generating circuit includes an adder that adds an offset voltage to the first signal.

(10)

The movement detection unit according to any one of (1) to (8), wherein the signal generating circuit includes an amplifier that amplifies the first signal.

(11)

The movement detection unit according to any one of (1) to (8), wherein the signal generating circuit includes a phase shift circuit that temporally shifts the first signal.

Although the technology has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

What is claimed is:

1. A movement detection unit comprising:

a movable body that performs a movement in a first direction;

a first sensor that detects a first magnetic field change which is caused by the movement of the movable body and outputs a first signal;

a second sensor that detects a second magnetic field change which is caused by the movement of the movable body and outputting a second signal; and a signal processor including a signal generating circuit that generates a third signal and a fourth signal based on the first signal, the third signal and the fourth signal having waveforms different from each other, and compares a voltage of the second signal to the voltages of the first, third, and fourth signals, wherein the first and second sensors are positioned such that a phase difference between the first and second signals is other than 180°.

2. The movement detection unit according to claim 1, wherein the movable body includes a gear teeth part having a plurality of projections and a plurality of depressions that are alternately disposed, and the signal generating circuit includes a pulse generator that generates a plurality of pulses within a period in which one of the projections or one of the depressions passes by both the first sensor and the second sensor.

3. The movement detection unit according to claim 1, wherein the movable body includes a ferromagnetic part having a plurality of N-pole regions and a plurality of S-pole regions that are alternately provided, and the signal generating circuit further includes a pulse generator that generates a plurality of pulses within a period in which one of the N-pole regions or one of the S-pole regions passes by both the first sensor and the second sensor.

4. The movement detection unit according to claim 1, wherein the signal generating circuit further includes:

a first comparator that outputs a fifth signal based on the comparison between voltages of the third signal and the second signal;

a second comparator that outputs a sixth signal based on the comparison between voltages of the fourth signal and the second signal; and a pulse generator that combines the fifth signal and the sixth signal and thereby generates a seventh signal containing a plurality of pulses.

5. The movement detection unit according to claim 4, wherein the movable body includes a gear teeth part having a plurality of projections and a plurality of depressions that are alternately disposed, and the pulse generator generates the plurality of pulses within a period in which one of the projections or one of the depressions passes by both the first sensor and the second sensor.

6. The movement detection unit according to claim 4, wherein the movable body includes a ferromagnetic part having a plurality of N-pole regions and a plurality of S-pole regions that are alternately provided, and the pulse generator generates the plurality of pulses within a period in which one of the N-pole regions or one of the S-pole regions passes by both the first sensor and the second sensor.

7. The movement detection unit according to claim 1, wherein the signal generating circuit includes an adder that adds an offset voltage to the first signal.

8. The movement detection unit according to claim 1, wherein the signal generating circuit includes an amplifier that amplifies the first signal.

9. The movement detection unit according to claim 1, wherein the signal generating circuit includes a phase shift circuit that temporally shifts the first signal.

10. A movement detector comprising:

a movable body that performs a movement in a first direction;

a first sensor that detects a first magnetic field change which is caused by the movement of the movable body and outputs a first signal;

a second sensor that detects a second magnetic field change which is caused by the movement of the movable body and outputting a second signal; and a signal processor including a signal generating circuit that generates a third signal and a fourth signal based on the first signal, the third signal and the fourth signal having waveforms different from each other, the signal generating circuit including:

a first comparator that outputs a fifth signal based on a comparison between voltages of the third signal and the second signal;

a second comparator that outputs a sixth signal based on a comparison between voltages of the fourth signal and the second signal; and a pulse generator that combines the fifth signal and the sixth signal and thereby generates a seventh signal containing a plurality of pulses, wherein the first and second sensors are positioned such that a phase difference between the first and second signals is other than 180°.

11. The movement detector according to claim 10, wherein the movable body includes a gear teeth part having a plurality of projections and a plurality of depressions that are alternately disposed, and the pulse generator generates the plurality of pulses within a period in which one of the projections or one of the depressions passes by both the first sensor and the second sensor.

12. The movement detector according to claim 10, wherein the movable body includes a ferromagnetic part having a plurality of N-pole regions and a plurality of S-pole regions that are alternately provided, and the pulse generator generates the plurality of pulses within a period in which one of the N-pole regions or one of the S-pole regions passes by both the first sensor and the second sensor.

13. A movement detector comprising:

a movable body that performs a movement in a first direction;

a first sensor that detects a first magnetic field change which is caused by the movement of the movable body and outputs a first signal;

a second sensor that detects a second magnetic field change which is caused by the movement of the movable body and outputting a second signal; and a signal processor including a signal generating circuit that generates a third signal and a fourth signal based on the first signal, and an eighth signal and a ninth signal based on the second signal, the third signal and the fourth signal having waveforms different from each other, and the eighth signal and the ninth signal having waveforms different from each other, the signal generating circuit including:

a third comparator that outputs a tenth signal based on a comparison between voltages of the third signal and the eighth signal;

a fourth comparator that outputs an eleventh signal based on a comparison between voltages of the fourth signal and the ninth signal; and a pulse generator that combines the tenth signal and the eleventh signal and thereby generates a twelfth signal containing a plurality of pulses, wherein the first and second sensors are positioned such that a phase difference between the first and second signals is other than 180°.

14. The movement detector according to claim 13, wherein
the movable body includes a gear teeth part having a plurality of projections and a plurality of depressions that are alternately disposed, and
the pulse generator generates the plurality of pulses within a period in which one of the projections or one of the depressions passes by both the first sensor and the second sensor.

15. The movement detector according to claim 13, wherein
the movable body includes a ferromagnetic part having a plurality of N-pole regions and a plurality of S-pole regions that are alternately provided, and
the pulse generator generates the plurality of pulses within a period in which one of the N-pole regions or one of the S-pole regions passes by both the first sensor and the second sensor.

\* \* \* \* \*